United States Patent [19]

Iijima et al.

[11] 4,401,149

[45] Aug. 30, 1983

[54] METHOD AND DEVICE FOR CONTROLLING AN AIR CONDITIONING SYSTEM

[75] Inventors: Tetsuya Iijima, Yamato; Seiichi Takahashi, Tokyo, both of Japan

[73] Assignee: Nissan Motor Company, Limited, Yokohama, Japan

[21] Appl. No.: 315,256

[22] Filed: Oct. 26, 1981

[30] Foreign Application Priority Data

Nov. 4, 1980 [JP] Japan .............................. 55-153719

[51] Int. Cl.³ .................... F28F 27/00; F25B 29/00; F25B 13/00
[52] U.S. Cl. ................................. 165/2; 62/229; 62/173; 165/28; 165/12
[58] Field of Search ............... 165/12, 28, 2; 62/90, 62/173, 231, 229, 209

[56] References Cited

U.S. PATENT DOCUMENTS

| | | | |
|---|---|---|---|
| 3,315,730 | 4/1967 | Weaver et al. | 165/28 |
| 4,089,462 | 5/1978 | Bradford | 236/91 R |
| 4,132,086 | 1/1979 | Kountz | 62/229 |
| 4,289,272 | 9/1981 | Murase et al. | 165/28 |
| 4,311,188 | 1/1982 | Kojima et al. | 165/2 |
| 4,323,111 | 4/1982 | Iijima | 165/28 |
| 4,325,426 | 4/1982 | Otsuka et al. | 165/2 |
| 4,337,818 | 7/1982 | Franz | 165/2 |
| 4,340,113 | 7/1982 | Iwata et al. | 165/28 |
| 4,356,705 | 11/1982 | Sutoh et al. | 62/229 |

Primary Examiner—Albert W. Davis, Jr.
Assistant Examiner—John K. Ford
Attorney, Agent, or Firm—Lane, Aitken & Kananen

[57] ABSTRACT

A method of and a device for controlling an air conditioning system in which an air-flow proportioning door is positioned between a heater unit and a refrigerant evaporator unit and is movable into and out of an angular position shutting off the flow of air from the evaporator unit to the heater unit and in which a refrigerant compressor unit associated with the evaporator unit is operated to alternately stop and start depending upon the temperature of the air delivered from the evaporator unit, wherein the angular position of the air-flow proportioning door and the compressor stop and start temperatures are controlled depending upon a target blowoff temperature calculated from decided and detected temperatures of the space to be air conditioned and a detected ambient temperature so as to reduce the duty cycle of the compressor unit.

7 Claims, 9 Drawing Figures

METHOD AND DEVICE FOR CONTROLLING AN AIR CONDITIONING SYSTEM

FIELD OF THE INVENTION

The present invention relates generally to air conditioning systems and particularly to a method of and a device for controlling an air conditioning system for, particularly, installation in a vehicle such as an automotive vehicle.

SUMMARY OF THE INVENTION

In accordance with one outstanding aspect of the present invention, there is provided a method of controlling an air conditioning system including a refrigerant evaporator unit, a refrigerant compressor unit, a heater unit positioned downstream of the evaporator unit and an air-flow proportioning door positioned between the evaporator unit and the heater unit and with respect to the heater unit movable into and out of a predetermined angular position shutting off the flow of air from the evaporator unit to the heater unit, comprising the steps of producing signals, and pieces of information, the signals being respectively representative of a desired temperature of the space to be air conditioned, a detected atmospheric temperature, a detected temperature of the air conditioned space, a detected angular position of the air-flow proportioning door, and a detected evaporator temperature of the air passed through the evaporator unit, the pieces of information being respectively indicative of the operative or inoperative condition of the refrigerant compressor, and a command of a person in the air conditioned space to put the refrigerant compressor into or out of operation, producing from the signals representative of the desired temperature of the space to be air conditioned, the detected atmospheric temperature and the detected temperature of the air conditioned space a target blowoff temperature of the air to be delivered from the evaporator unit, comparing the target blowoff temperature with a predetermined critical temperature for producing a signal indicative of the above mentioned predetermined angular position of the air-flow proportioning door when the target blowoff temperature is found lower than the predetermined critical value or indicative of a desired angular position of the door, the desired angular position of the door being variable with the target blowoff temperature, in the presence of the piece of information indicating the person's command to put the refrigerant compressor into operation, producing from the target blowoff temperature signals respectively representative of desired compressor stop and start temperatures at which the compressor unit is to be brought to a stop and thereafter actuated to start, the desired compressor stop and start temperatures being variable with the target blowoff temperature when the target blowoff temperature is lower than the predetermined critical value and being fixed when the target blowoff temperature is higher than the predetermined critical value, comparing the signal representative of said detected evaporator temperature with the signals respectively representative of the desired compressor stop and start temperatures for producing a command signal to hold the compressor unit operative when the detected evaporator temperature is found higher than the desired compressor stop temperature with the piece of information indicating the operating condition of the refrigerant compressor unit and to actuate the compressor unit to a start when the detected evaporator temperature is found higher than the desired compressor start temperature with the piece of information indicating the inoperating condition of the refrigerant compressor unit, the command signal bringing the refrigerant compressor unit to a stop when the detected evaporator temperature is found lower than the desired compressor stop temperature with the piece of information indicating the operating condition of the refrigerant compressor unit, the command signal further holding the refrigerant compressor unit inoperative when the detected evaporator temperature is lower than the desired compressor start temperature with the piece of information indicating the inoperating condition of the refrigerant compressor unit, and in the presence of the signal representative of the desired angular position, comparing the signal representative of the desired angular position with the signal representative of the detected angular position of the air-flow proportioning door for producing a command signal indicative of the angular position to which said air-flow proportioning door is to be moved.

In accordance with another outstanding aspect of the present invention, there is provided a control device of an air conditioning system including a refrigerant evaporator unit, a refrigerant compressor unit including electrically-operated actuating means, a heater unit positioned downstream of the evaporator unit, an air-flow proportioning door positioned between the evaporator unit and the heater unit and movable with respect to the heater unit into and out of a predetermined angular position shutting off the flow of air from the evaporator unit to the heater unit, and electrically-operated door actuating means operative to drive the air-flow proportioning door to continuously move out of and into the aforesaid predetermined angular position thereof, comprising means operative to produce signals respectively representative of a desired temperature of the space to be air conditioned, a detected atmospheric temperature, a detected temperature of the air conditioned space, a detected angular position of the air-flow proportioning door, and a detected evaporator temperature of the air passed through the evaporator unit, switch means operative to produce pieces of information respectively indicative of the operative or inoperative condition of the refrigerant compressor unit, and a command of a person in the air conditioned space to put the refrigerant compressor unit into or out of operation, a target blowoff temperature calculating module responsive to the signals representative of the desired temperature of the space to be air conditioned, the detected atmospheric temperature and the detected temperature of the air conditioned space, the target blowoff temperature calculating module being operative to produce a signal representative of a target blowoff temperature of the air to be delivered from the evaporator unit, the target blowoff temperature being variable with the desired temperature of the space to be air conditioned, the detected atmospheric temperature and the detected temperature of the air conditioned space, a desired door-position calculating module responsive to the signal from the target blowoff temperature calculating module and operative to compare the target blowoff temperature with a predetermined critical value for producing a signal indicative of the predetermined angular position of the air-flow proportioning door when the target blowoff temperature is found lower than the predetermined critical value or indicative of a desired angular position of the door, the signal representative of the desired angular position of the door being variable with the signal representative of the target blowoff temperature, a desired evaporator temperature calculating module responsive to the signal from the target temperature calculating module and operative to produce signals respectively representative of desired compressor stop and start temperatures at which the compressor unit is to be brought to a stop and thereafter actuated to start, in the presence of the piece of information indicating the person's command to put the refrigerant compressor into operation, the signals produced by the desired evaporator temperature calculating module being variable with the signal from the target temperature calculating module when the target blowoff temperature is lower than the predetermined critical value and being fixed when the target blowoff temperature is higher than the predetermined critical value, a door-position error detecting module responsive to the signal from said desired door-position calculating module and the signal representative of the detected angular position of the air-flow proportioning door and operative to compare these signals with each other for supplying to the aforesaid door actuating means a command signal indicative of the angular position to which the air-flow proportioning door is to be moved, and a temperature comparator module responsive to the signals from said desired evaporator temperature calculating module and the signal representative of the detected evaporator temperature and operative to compare the signal representative with the detected evaporator temperature with the signals representative of the desired compressor stop and start temperatures for supplying to the actuating means of the compressor unit a command signal effective to hold the compressor unit operative when the detected evaporator temperature is found higher than the desired compressor stop temperature with the piece of information indicating the operating condition of the refrigerant compressor unit and to actuate the compressor unit to a start when the detected evaporator temperature is found higher than the desired compressor start temperature with the piece of information indicating the inoperating condition of the refrigerant compressor, the command signal bringing the refrigerant compressor unit to a stop when the detected evaporator temperature is found lower than the desired compressor stop temperature with the piece of information indicating the operating condition of the refrigerant compressor unit, the command signal further holding the refrigerant compressor unit inoperative when the detected evaporator temperature is found lower than the desired compressor start temperature with the piece of information indicating the inoperating condition of the refrigerant compressor.

BRIEF DESCRIPTION OF THE DRAWINGS

The features of a method and a device according to the present invention will be more clearly understood from the following description taken in conjunction with the accompanying drawings in which.

DESCRIPTION OF THE PREFERRED EMBODIMENT

Figure 1:
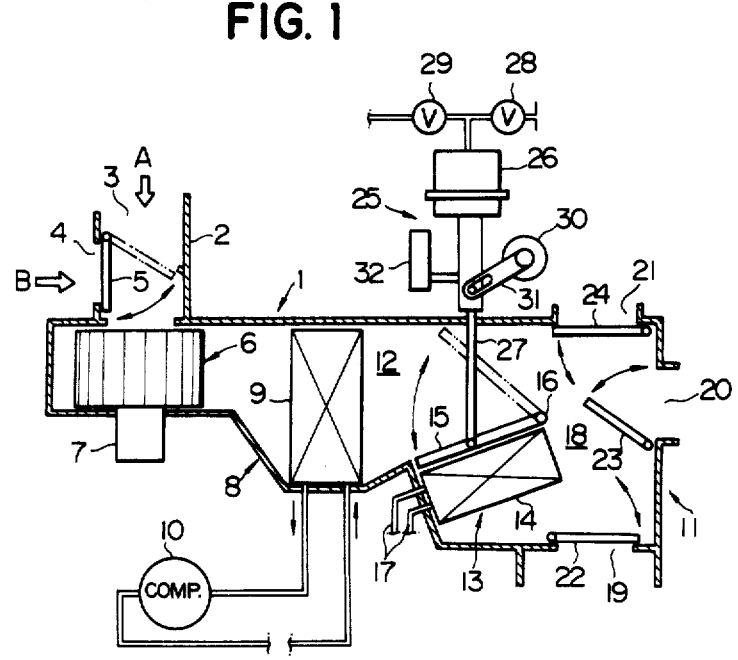
FIG. 1 is a schematic sectional view of the mechanical arrangement of an automotive air conditioning system of the nature to which the present invention appertains.

Referring to the drawings, first particularly to FIG. 1 thereof, an automotive air conditioning system to which the present invention appertains is shown comprising an air conditioner assembly 1 having an air conditioner duct structure which includes an air intake box portion 2 formed with a fresh air intake 3 and a recirculated air intake 4. In the air intake box portion 2 is provided with an intake air shift door 5 which is pivotally movable between an angular position allowing the fresh air intake 3 to be fully open and closing the recirculated air intake 4 as indicated by full lines and an angular position closing the fresh air intake 3 and allowing the recirculated air intake 4 to be fully open as indicated by broken lines. The intake air shift door 5 is movable between these two angular positions so as to regulate entry of fresh or recirculated air into the air intake box portion 2 through the fresh air intake 3 or the recirculated air intake 4 as indicated at A and B, respectively. The intake air shift door 5 is operated by a vacuum-operated door actuator unit (not shown).

The atmospheric air or the air recirculated from the vehicle compartment (not shown) thus entering the air intake box portion 2 is forced into the air conditioner assembly 1 by means of a suitable forced-flow inducing unit which is shown constituted by an air-intake blower 6 positioned downstream of the air intake box portion 2. The air-intake blower 6 herein shown is assumed, by way of example, to be of the variable-speed motor-driven type and is shown constituted by a centrifugal or Sirocco fan provided with and driven by an electric motor 7.

The duct structure of the air conditioner assembly 1 further includes an evaporator housing portion 8 having provided therein a refrigerant evaporator unit 9 which is positioned on the leeward side of the air intake blower 6. The refrigerant evaporator unit 9 is adapted to convert a refrigerant fluid into a gaseous state to extract heat of evaporation from the flow of air passed therethrough and forms part of a refrigeration system which further comprises an engine-driven refrigerant compressor unit 10 having a suction port communicating with the refrigerant discharge end of the evaporator unit 9. The compressor unit 10 is adapted to convert the low-temperature, low-pressure refrigerant gas from the evaporator unit 9 into a high-temperature, high-pressure refrigerant gas. Though not shown in the drawings, the refrigeration system including the refrigerant compressor unit 10 further comprises a condenser unit having an inlet end communicating with the delivery port of the compressor unit 10 and adapted to covert the refrigerant gas from the compressor unit 10 into a liquid state, and an expansion valve provided between the outlet end of the condenser unit and a refrigerant inlet end of the evaporator unit 9. The compressor unit 10 is provided with suitable actuating means such as an electromagnetically operated clutch (not shown) and is made operative and inoperative by selective coupling and uncoupling of the clutch, as is well known in the art.

The duct structure of the air conditioner assembly 1 further includes an air distribution housing portion 11 having formed therein an air entrance chamber 12 which is located on the leeward side of the evaporator unit 9. In the air entrance chamber 12 is provided an air heating unit 13 comprising an air heater unit 14 positioned downstream of the evaporator unit 9 and an air-flow proportioning door 15 disposed between the evaporator unit 9 and the heater unit 14. The air-flow proportioning door 15 is pivotally mounted on a shaft 16 and is movable about the shaft 16 between a first angular position to shut off the flow of air from the air entrance chamber 12 to the heater unit 14 as indicated by full lines and a second angular position to induct the flow of air from the entrance chamber 12 totally to the heater unit 14 as indicated by broken lines. The proportioning door 15 is continuously movable between these two angular positions about the shaft 16 and is operative to regulate the proportion in which the cooled air delivered from the refrigerant evaporator unit 9 into the air entrance chamber 12 is to be passed through the heater unit 14. The heater unit 14 is usually of the type adapted to recirculate therethrough the cooling water which has been circulated through the cooling system of the engine. The heater unit 14 is thus shown provided with conduits 17 communicating with the cooling system of the engine through a suitable flow shut-off valve such as a hot-water cock (not shown) which is mechanically connected to and accordingly movable with the air-flow proportioning door 15. The hot-water cock is operated by a vacuum-operated actuator unit (not shown).

The air distribution housing portion 11 of the air conditioner duct structure is further formed with an air distribution chamber 18 which is located downstream of the air entrance chamber 12 partially across the heater unit 14 and partially aside from the heater unit 14. The air-flow proportioning door 15 is, thus, adapted to regulate the proportion between the flow rate of air to be passed from the air entrance chamber 12 to the air distribution chamber 18 through the heater unit 14 and the flow rate of air to be passed directly from the air entrance chamber 12 to the air distribution chamber 18. When the air-flow proportioning door 15 is held in an angular position intermediate between the above mentioned first and second angular positions thereof about the shaft 16, the air passed through and heated by the heater unit 14 is mixed in the air distribution chamber 18 with the cooled air passed directly from the entrance chamber 12 to the air distribution chamber 18, producing in the air distribution chamber 18 air with a temperature dictated by the proportion between the draught volumes of air past the air-flow proportioning door 15.

The duct structure of the air conditioner assembly 1 further has air outlets 19, 20 and 21 communicating with, for example, instrument panel ventilator ducts, flow ventilation nozzles and windshield defroster nozzles (not shown). The draught volumes of the air to be distributed from the air distribution chamber 18 to these air outlets 19, 20 and 21 are regulated by draught control doors 22, 23 and 24, respectively, which are provided in the air distribution chamber 18. Though not shown in the drawings, each of the draught control doors 22, 23 and 24 is operated by a vacuum-operated door actuator unit.

The temperature of air in the air distribution chamber 18 is dictated by the proportion between the draught volume of the air passed through the heater unit 14 and the draught volume of the air bypassing the heater unit 14 as above described and is accordingly determined by the angular position of the air-flow proportioning door 15 about the shaft 16. To control the angular position of the air-flow proportioning door 15, there is provided a door control device 25.

In FIG. 1 of the drawings, the door control device 25 is shown comprising a vacuum-operated door actuator unit 26 mechanically coupled to the air-flow proportioning door 15 by means of a door actuating rod 27. Though not shown in the drawings, the vacuum-operated door actuator unit 26 is formed with a variable-volume control chamber which is in part defined by a spring-loaded flexible diaphragm. The above mentioned door actuating rod 27 is secured at one end thereof to this diaphragm and is pivotally connected at the other end thereof to the air-flow proportioning door 15, which is accordingly pivotally movable about the shaft 16 as the diaphragm of the door actuator unit 26 is moved or deformed to cause expansion or contraction of the variable-volume control chamber of the actuator unit 26. The control chamber of the actuator unit 26 is communicable selectively with the open air through a solenoid operated air-induction valve 28 or with a suitable source of vacuum (not shown) through a solenoid-operated vacuum-induction valve 29. When the air-induction valve 28 is open wth the vacuum-induction valve 29 closed, atmospheric air is introduced through the air-induction valve 28 into the control chamber of the door actuator unit 26 and allows the control chamber to be expanded by the force of the spring acting on the diaphragm of the actuator unit 26. When, on the other hand, the vacuum-induction valve 29 is open with the air-induction valve 28 held closed, air in the control chamber of the door actuator unit 26 is evacuated therefrom through the vacuum-induction valve 29 so that the control chamber is caused to contract against the force of the spring acting on the diaphragm of the actuator unit 26. Each of the valves 28 and 29 is electrically actuated to produce an opening degree continuously variable with an electric control signal supplied to a solenoid coil (not shown) of the valve. The axial position of the actuating rod 27 with respect to the duct structure of the air conditioner assembly 1 and accordingly the angular position of the air-flow proportioning door 15 with respect to the heater unit 14 are, thus, continuously variable with the electric control signals respectively applied to the solenoid coils of the valves 28 and 29.

The angular position of the air-flow proportioning door 15 thus operated by the door actuator unit 26 is detected by door position detecting means which is shown constituted by a feedback potentiometer unit 30 engaging the actuating rod 27. Designated by 32 is a vacuum programming switch which is mechanically connected to the actuating rod 27 and which is accordingly responsive to the angular displacement of the air-flow proportioning door 15. The vacuum programming switch 32 is operative to control the vacuum to be inducted to each of the vacuum operated actuator units for the intake air shift door 5, the draught control doors 22, 23 and 24 and the hot-water cock for the heater unit 14.

In the air conditioning system of the nature hereinbefore described, the air sucked into the air conditioner assembly 1 through the fresh air intake 3, the recirculated air intake 4 or both of these is cooled by the refrigerant evaporator unit 9 to a predetermined temperature of, for example, about 4° C. without respect to the temperature of the air to be distributed from the air distribution chamber 18. When the air-flow proportioning door 15 is held in an angular position allowing the heater unit 14 to be open to the air entrance chamber 12, the air thus cooled by the evaporator unit 9 is at least partially heated by the heater unit 14 so as to produce air with a desired temperature in the air distribution chamber 18. Conditioning air in these two steps is advantageous in that a broad range of temperatures is available of conditioned air and in that the air to be conditioned is dehumidified when passed through the evaporator unit 9. The latter effect is of importance especially at sultry seasons when relatively hot air is to be cooled by the air conditioning system.

Figure 2:
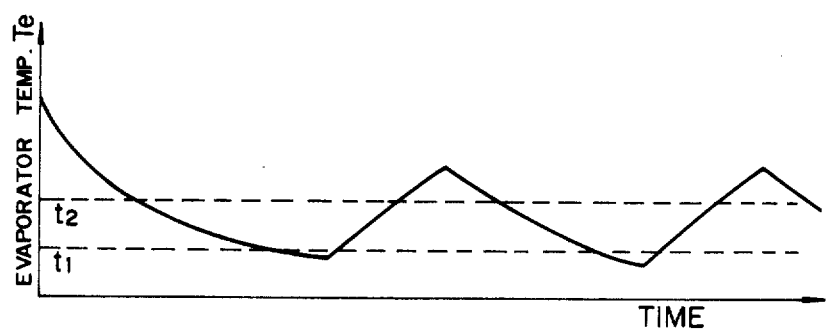
FIG. 2 is a graph showing variation, in terms of time, in the evaporator temperature of the air delivered from a refrigerant evaporator unit in an air conditioning system using a prior-art control device.

In the air conditioning system constructed and arranged as hereinbefore described with reference to FIG. 1, it has been an ordinary practice to have the refrigerant compressor unit 10 of the refrigeration system operated in such a manner that the compressor unit 10 is periodically brought to a stop each time the temperature of the cooled air delivered from the evaporator unit 9 approaches a predetermined degree $t_1$ of, for example, about 0° C. This is important for preventing the refrigerant evaporator unit 9 from being frozen up by accumulation of frost on the fins of the evaporator unit. When the temperature of the cooled air delivered from the evaporator unit 9 rises to a predetermined degree $t_2$ of, for example, about 4° C. after the refrigerant compressor unit 10 is thus made inoperative, the compressor unit 10 is put into operation for a second time so as to enable the evaporator unit 9 to cool the air supplied thereto. As a consequence, the temperature (Te) of the air passed through the evaporator unit 9 with the compressor unit 10 operated in this fashion varies cyclically between values respectively close to the above mentioned predetermined degrees $t_1$ and $t_2$ as indicated in FIG. 2 of the drawings.

Figure 3:
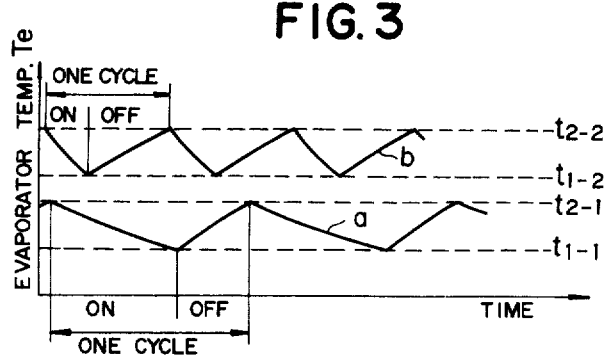
FIG. 3 is a graph showing variation, in terms of time, in relatively low and relatively high evaporator temperatures.

Experiments have been conducted by the inventors to determine the characteristics with which the temperature Te of the air passed through the refrigerant evaporator unit 9 varies when the temperatures $t_1$ and $t_2$ are selected at relatively low levels $t_{1-1}$ and $t_{2-1}$ and relatively high levels $t_{1-2}$ and $t_{2-2}$, respectively. In this instance, the temperature levels $t_{1-1}$, $t_{2-1}$, $t_{1-2}$ and $t_{2-2}$ have been selected in such a manner that the lower temperature range between the levels $t_{1-1}$ and $t_{2-1}$ is substantially equal to the higher temperature range between the levels $t_{1-2}$ and $t_{2-2}$. The results of the experiments thus conducted are indicated by curves a and b in FIG. 3, wherein ON and OFF denote the durations for which the refrigerant compressor unit 10 is held operative and inoperative, respectively. From the curves a and b shown in FIG. 3, it will be observed that the duty cycle of the refrigerant compressor unit 10 is shorter for the higher temperature range $t_{1-2}$-$t_{2-2}$ than for the lower temperature range $t_{1-1}$-$t_{2-1}$. This clearly suggests that it is advantageous for the sake of saving the energy required for the operation of the air conditioning system that the refrigerant compressor unit 10 be made operative and inoperative in response to relatively high temperatures of the air passed through the refrigerant evaporator unit 9.

On the other hand, the atmospheric air is far less humid at cold seasons than in summertime and, for this reason, the air to be conditioned at cold seasons need not be positively dehumidified. It is thus desirable also for the sake of energy economy to have the refrigerant evaporator unit 9 held inoperative when the temperature of the atmospheric air is at relatively low levels.

The present invention contemplates provision of a device for controlling the air conditioning system of the described nature in such a manner as to realize the above described advantages.

Figure 4:
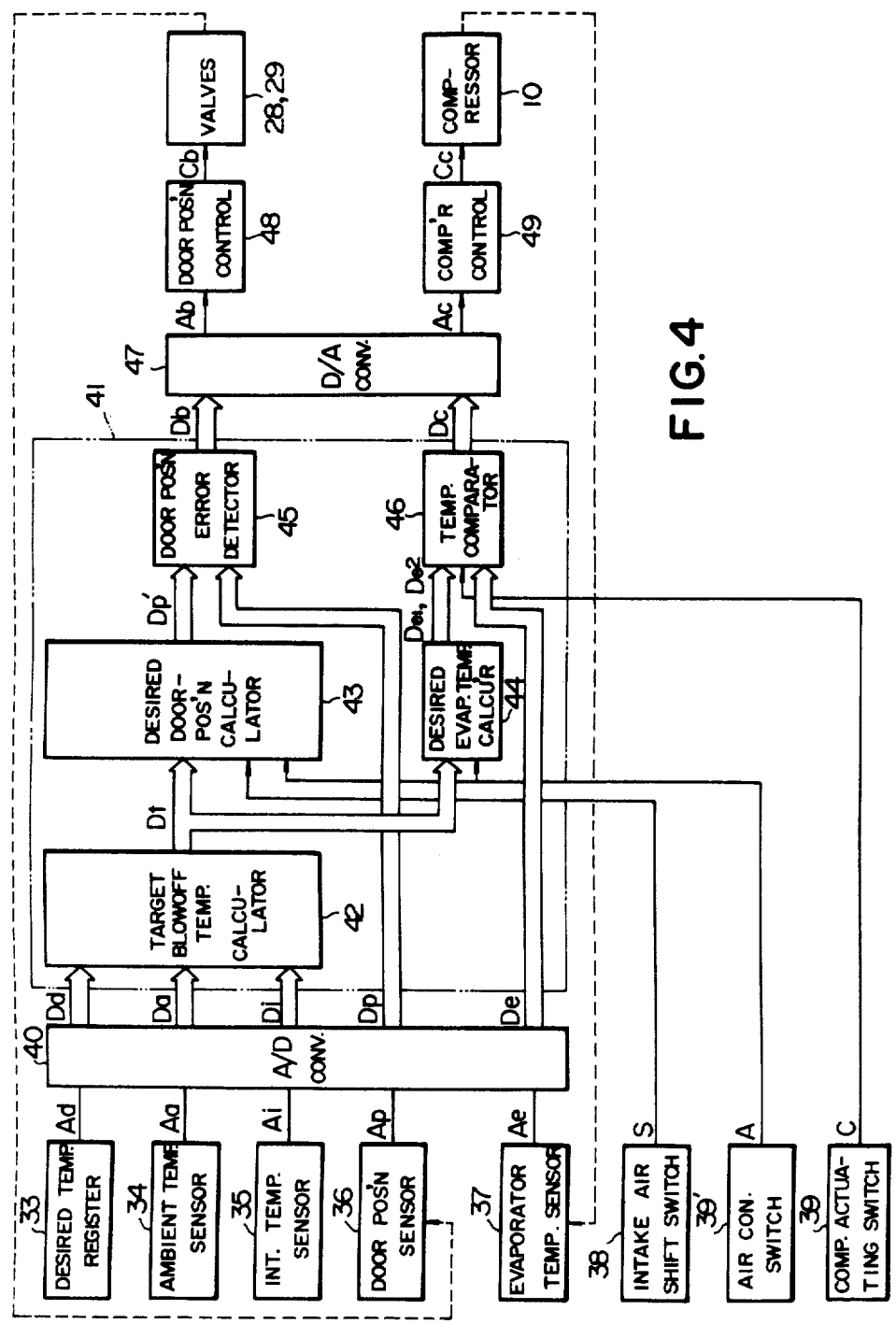
FIG. 4 is a block diagram showing a preferred embodiment of a control device according to the present invention.

A preferred embodiment of a control device according to the present invention will be hereinafter described with reference concurrently to FIGS. 1 and 4 of the drawings. As illustrated in FIG. 4, the control device embodying the present invention comprises a desired internal temperature register 33, an ambient temperature sensor 34, an internal temperature sensor 35, a door position sensor 36, and an evaporator temperature sensor 37. The desired internal temperature register 33 is adapted to register therein a desired temperature Td of the air in the interior of the vehicle and to produce an analog output signal Ad representative of the desired internal temperature Td. The ambient temperature sensor 34 is operative to detect the temperature Ta of the atmospheric air and to produce an analog output signal Aa representative of the detected atmospheric temperature Ta. The internal temperature sensor 35 is operative to detect the temperature Ti of air in the interior of the vehicle and to produce an analog output signal Ai representative of the detected internal temperature Ti. Furthermore, the door position sensor 36 is operative to detect the angular position P of the air-flow proportioning door 15 with respect to the heater unit 14 in the air conditioner assembly 1 illustrated in FIG. 1 and to produce an analog output signal Ap representative of the detected angular position P of the door 15. The door position sensor 36 is herein assumed, by way of example, as being constituted by the feedback potentiometer unit 30 in the air conditioning system illustrated in FIG. 1. On the other hand, the evaporator temperature sensor 37 is operative to detect the evaporator temperature Te of the air passed through the refrigerant evaporator unit 9 of the air conditioner assembly 1 shown in FIG. 1 and to produce an analog signal Ae representative of the detected evaporator temperature Te.

The control device shown in FIG. 4 further comprises switches including a shift-door position responsive switch 38, a compressor actuating switch 39 and an air conditioner switch 39'. The shift-door position responsive switch 38 is responsive to the movement of the intake air shift-door 5 in the air conditioning system illustrated in FIG. 1 and is closed when the shift-door 5 is in the position allowing the fresh air intake 3 to be fully open and open when the shift-door 5 is in the position allowing the recirculated air intake 4 to be fully open. The door-position responsive switch 38 is thus adapted to produce a piece of information S indicative of the position of the intake air shift-door 5. The compressor actuating switch 39 is electrically connected between a power source (not shown) and the solenoid coil of the solenoid-operated clutch of the refrigerant compressor unit 10 in the system illustrated in FIG. 1 and is operative to actuate the clutch to couple and thereby put the compressor unit 10 into operation when closed. The compressor actuating switch 39 is thus adapted to produce a piece of information C indicative of the operative or inoperative condition of the refrigerant compressor unit 10. Furthermore, the air conditioner switch 39' is manually operated by a person in the interior of the vehicle and is adapted to produce a piece of information A indicative of the person's command to put the compressor unit 10 into or out of operation.

The desired internal temperature register 33, ambient temperature sensor 34, internal temperature sensor 35, door position sensor 36 and evaporator temperature sensor 36 are connected to the input terminals of analog-to-digital (A/D) converters 40 so that the analog output signal Ad delivered from the register 33 and the analog output signals Aa, Ai, Ap and Ae respectively delivered from the sensors 34, 35, 36 and 37 are converted into corresponding digital signals Dd, Da, Di, Dp and De, respectively. The digital signals Dd, Da, Di, Dp and De thus produced by the analog-to-digital converters 40 are fed to a signal processing network 41.

The signal processing network 41 comprises a target blowoff temperature calculating module 42, a desired door-position calculating module 43, a desired evaporator temperature calculating module 44, a door-position error detecting module 45 and a temperature comparator module 46 as shown. The target blowoff temperature calculating module 42 has input ports connected to the output terminals of the analog-to-digital converters 40 connected to the desired internal temperature register 33, ambient temperature sensor 34 and internal temperature sensor 35. The calculating module 42 is adapted to calculate a target blowoff temperature Tt of the air to be blown off from the air conditioning system from the digital signals Dd, Da and Di delivered from the analog-to-digital converters 40 connected to the register 33 and sensors 34 and 35, producing a digital output signal Dt representative of the target blowoff temperature Tt. The target blowoff temperature Tt is calculated from the digital signals Dd, Da and Di on the basis of suitable parameters stored together with the above mentioned function f(Td, Ta, Ti) in the calculating module 42 and is thus variable as a function f(Td, Ta, Ti) of the desired internal temperature Td, detected ambient temperature Ta and detected internal temperature Ti of the vehicle, as will be described in more detail.

Figure 5A:
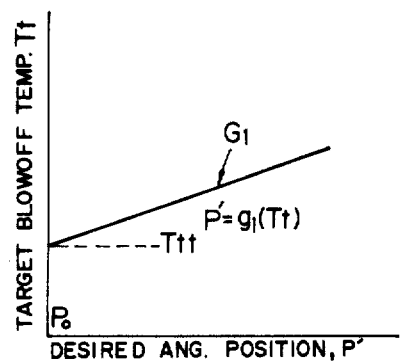
FIG. 5A is a graph showing the relationship between a target blowoff temperature calculated in the control device illustrated in FIG. 4 and a desired angular position of an air-flow proportioning door forming part of the air conditioning system of FIG. 1 under conditions in which a refrigerant compressor unit included in the air conditioning system is operative.
Figure 5B:
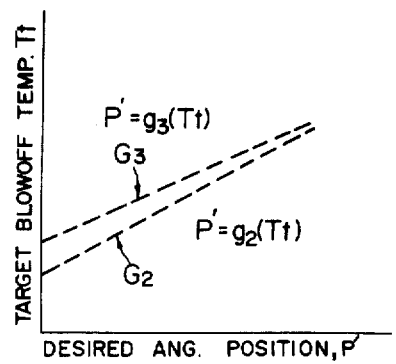
FIG. 5B is a graph showing the relationship between the target blowoff temperature and the desired angular position of the air-flow proportioning door under conditions in which the refrigerant compressor unit is held at rest.

The signal Dt thus produced by the target blowoff temperature calculating module 42 is fed to each of the desired door-position calculating module 43 and the desired evaporator temperature calculating module 44. The desired door-position calculating module 43 is adapted to calculate from the input signal Dt a desired angular position P' of the air-flow proportioning door 15 with respect to the heater unit 14 in the system illustrated in FIG. 1 and to produce a digital output signal Dp' representative of the desired angular position of the door 15 thus calculated. The calculating module 43 has control terminals connected to the shift-door position responsive switch 38 and the air conditioner switch 39' and is operative to produce the output signal Dp' which varies depending upon the open or closed condition of each of the switches 38 and 39'. When the air conditioner switch 39' is closed and accordingly the piece of information A indicative of the person's command to put the compressor unit 10 into operation is fed to the calculating module 43, the output signal Dp' produced by the calculating module 43 varies as a function $g_1(Tt)$ of the target blowoff temperature Tt as indicated by plot $G_1$ in FIG. 5A if the target blowoff temperature Tt is higher than a predetermined critical value Ttt. If the target blowoff temperature Tt is lower than the predetermined critical value Ttt with the air conditioner switch 39' closed, the signal Dp' produced by the calculating module 43 is indicative of a zero-degree angular position Po of the air-flow proportioning door 15 fully isolating the flow of air in the air entrance chamber 12 from the heater unit 14 in the system shown in FIG. 1. When, on the other hand, the air conditioner switch 39' is open, then the output signal Dp' produced by the calculating module 43 varies as a function $g_2(Tt)$ of the target blowoff temperature Tt as indicated by plot $G_2$ in FIG. 5B if the shift-door position responsive switch 38 is closed and as a function $g_3(Tt)$, of the target blowoff temperature Tt as indicated by plot $G_3$ in FIG. 5B if the switch 38 is open. The functions $g_1(Tt)$, $g_2(Tt)$ and $g_3(Tt)$ above mentioned are stored in the desired door-position calculating module 43. In each of FIGS. 5A and 5B, the angular position of the air-flow proportioning door 15 is indicated in terms of the angle which the door 15 makes with respect to the heater unit 14 about the center axis of the shaft 16 and is represented by zero degrees when the door 15 is held in the angular position fully isolating the heater unit 14 from the air entrance chamber 12.

The signal Dp' thus produced by the desired door-position calculating the module 43 and the digital signal Dp produced by the analog-to-digital converter 40 connected to the door position sensor 36 are fed to the door-position error detecting module 45. The door-position error detecting module 45 is constituted by a comparator circuit and is adapted to produce a digital door-position error signal Db representative of the difference between the detected angular position P and the desired angular position P' of the door 15 as represented by the signals Dp and Dp', respectively.

Figure 6:
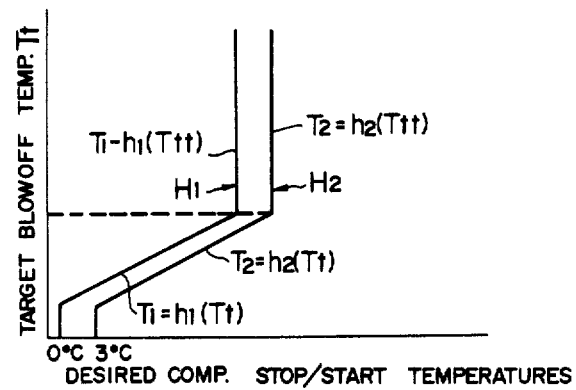
FIG. 6 is a graph showing the relationship between the target blowoff temperature and the evaporator temperature as achieved by the control device illustrated in FIG. 4.

On the other hand, the desired evaporator temperature calculating module 44 is adapted to calculate from the output signal Dt from the target blowoff temperature calculating module 42 a desired evaporator temperature Te' of the air to be delivered from the refrigerant evaporator unit 9 in the system illustrated in FIG. 1 and to produce two digital output signals $De_1$ and $De_2$ representative of desired compressor stop and start temperatures $T_1$ and $T_2$ at which the refrigerant compressor unit 10 (FIG. 1) is to be brought to a stop and thereafter actuated to start, respectively. The desired compressor stop and start temperatures $T_1$ and $T_2$ are produced as functions $h_1(Tt)$ and $h_2(Tt)$, respectively, of the target blowoff temperature Tt when the target blowoff temperature Tt is lower than the predetermined critical value Ttt and as constant $h_1(Ttt)$ and $h_2(Ttt)$, respectively, when the target blowoff temperature Tt is higher than the predetermined critical value Ttt as indicated by plots H₁ and H₂ in FIG. 6 of the drawings. Thus, the desired compressor stop and start temperatures T₁ and T₂ determined by the calculating module 44 increase from predetermined values of, for example, 0° C. and 3° C., respectively, as the target blowoff temperature Tt represented by the signal Dt delivered from the calculating module 42 increases up to the previously mentioned predetermined critical value Ttt. When the target blowoff temperature Tt is higher than the critical value Ttt, the desired compressor stop and start temperatures T₁ and T₂ remain constant. As will be further seen from FIG. 6, the desired compressor start temperature T₂ is constantly higher by a predetermined value of, for example, 3 degrees than the desired compressor stop temperature T₁. The critical value Ttt of the target blowoff temperature Tt is selected as a desired crest value of the periodically varying temperature Te of the cooled air delivered from the refrigerant evaporator unit 14 in the system shown in FIG. 1. The desired evaporator temperature calculating module 44 has a control terminal connected to the air conditioner switch 39' and is operative to produce the signals De₁ and De₂ only when the switch 39' is closed.

The signals De₁ and De₂ thus produced by the desired evaporator temperature calculating module 44, the signal De delivered from the analog-to-digital converter 40 connected to the evaporator temperature sensor 37 and the piece of information C produced by the compressor actuating switch 39 are fed to the temperature comparator module 46. In the temperature comparator module 46, the signal De representative of the detected evaporator temperature Te of the air passed through the evaporator unit 14 (FIG. 1) is compared with the signals De₁ and De₂ representative of the desired compressor stop and start temperatures T₁ and T₂, respectively, and causes the comparator module 46 to produce a digital output signal Dc when the detected evaporator temperature Te represented by the signal De is found higher than the desired compressor stop temperature T1 with the piece of information C indicating the operating condition of the refrigerant compressor unit 10. The temperature comparator module 46 also produces the digital output signal Dc when the detected evaporator temperature Te is found higher than the desired compressor start temperature T2 with the piece of information C indicating the inoperating condition of the refrigerant compressor unit 10.

Figure 7:
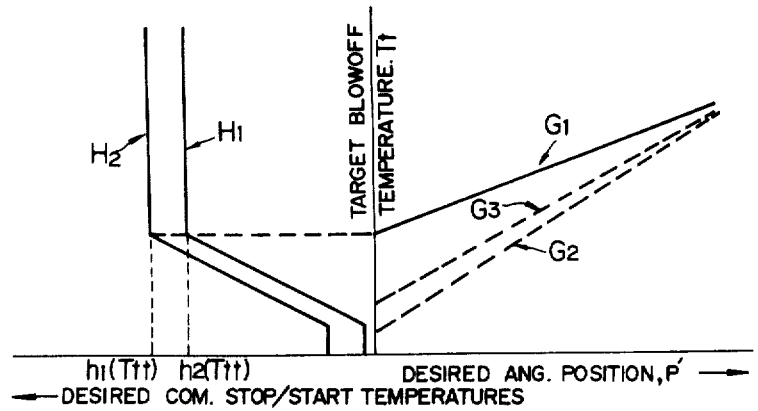
FIG. 7 is a graph in which the characteristics indicated by the graphs of FIGS. 5A and 5B are shown combined.

The digital output signals Db and Dc thus delivered from the signal processing network 41 are supplied to digital-to-analog (D/A) converters 47 and are thereby converted into corresponding analog signals Ab and Ac, respectively. The analog signal Ab is fed to a door position control circuit 48 adapted to produce from the signal Ab a command signal Cb for controlling the angular position of the air-flow proportioning door 15 in the system illustrated in FIG. 1. The command signal Cb thus produced by the door position control circuit 48 is fed to the solenoid coils of the solenoid-operated air-induction and vacuum-induction valves 28 and 29 and actuates the valves 28 and 29 and accordingly the vacuum-operated door actuator unit 26 in such a manner as to drive the air-flow proportioning door 15 to pivotally moves to an angular position dictated by the output signal from the door control circuit 48. On the other hand, the analog signal Ac delivered from the digital-to-analog converter 47 connected to the temperature comparator module 46 is fed to a compressor control circuit 49 adapted to produce from the signal Ac a command signal Cc for actuating the refrigerant compressor unit 10 in the system illustrated in FIG. 1. The command signal Cc thus produced by the compressor control circuit 49 is supplied to the solenoid of the solenoid-operated clutch of the refrigerant compressor unit 10 and permits the compressor unit to remain operative. The angular position P of the air-flow proportioning door 15 (FIG. 1) and the evaporator temperature Te of the air to be delivered from the air conditioning system are in these manners controlled to vary with the target blowoff temperature Tt as graphically depicted in FIG. 7 of the drawings.

When, now, the temperature of the conditioned space in a vehicle is maintained at a fixed value, the quantity Qt of the heat delivered from the air conditioning system is equal to the sum of the thermal loads of the vehicle. In this instance, the thermal loads applied to the vehicle include the heat Qr transmitted into or out of the vehicle due to the difference between the atmospheric temperature and the temperature in the conditioned space of the vehicle, the heat Qv of ventilation air, the heat Qs of solar and sky radiation, the heat Qm radiated from the vehicle occupant or occupants, and the heat Qg emitted from the engine and other heat-generating instruments and devices of the vehicle. The quantity Qt of the heat delivered from the air conditioning system is thus as $$Qt = Qr + Qv + Qs + Qm + Qg. \quad \text{Eq. 1}$$

This quantity of heat Qt is a function of the difference between the temperature Tt of the air delivered from the air conditioning system and the temperature Ti of the conditioned air in the vehicle. On the other hand, each of the thermal loads Qr and Qv is dictated by the difference between the atmospheric temperature Ta and the temperature Ti of the conditioned space in the vehicle, while the thermal load Qs is determined by the temperature Ts of solar and sky radiation. The loads Qm and Qg can be practically deemed as substantially unchanged. Thus, the above Equation 1 can be translated into the following equation of temperature equilibrium:

$$Tt = a \cdot Ti + b \cdot Ta + c \cdot Ts + d, \quad \text{Eq. 2}$$

where a, b, c and d are constants. Assuming, now, that the temperature of the air delivered from the air conditioning system when the temperature Ti of the conditioned space in the vehicle has a predetermined value Ti' is denoted as Td', the temperature Td' is given as $$Td' = a \cdot Ti' + b \cdot Ta + c \cdot Ts + d. \quad \text{Eq. 3}$$

From Equations 2 and 3, the target blowoff temperature Tt at a given temperature Ti of the conditioned space can be expressed in the form $$Tt = Td' + T. \quad \text{Eq. 4}$$

where $$T = a(Ti' - Ti) \quad \text{Eq. 5}$$

In the circuit arrangement illustrated in FIG. 4, the target blowoff temperature calculating module 42 has registered therein the values of the constants a, b, c and d and the temperature Ts of solar and sky radiation and is programmed to base the calculation on the above Equations 3, 4 and 5 when supplied with the signals Dd, Da and Di representative of the desired internal temperature Td, the detected ambient temperature Ta and the detected internal temperature Ti, respectively, of the vehicle.

Figure 8:
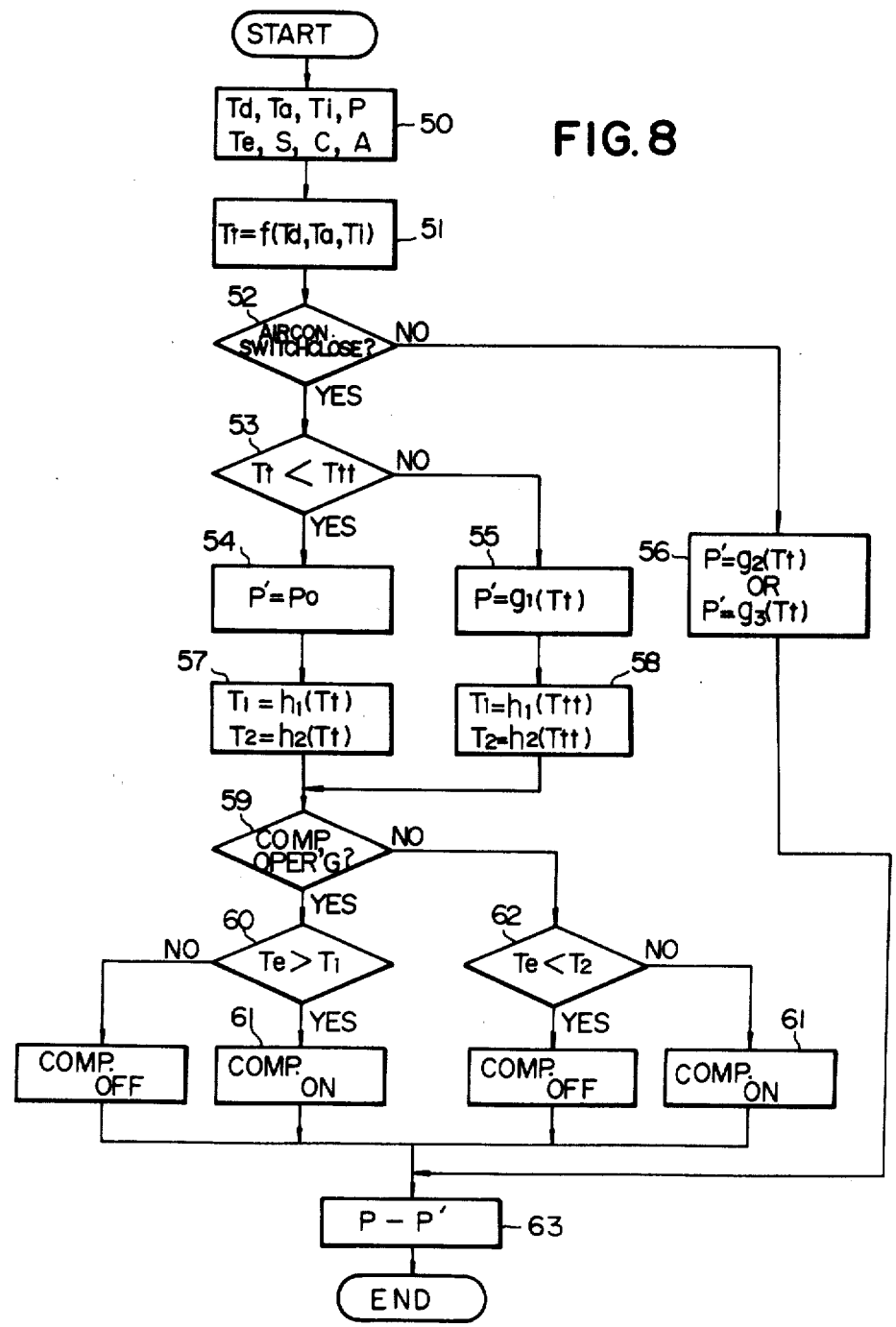
FIG. 8 is a flowchart showing a method according to the present invention.

FIG. 8 of the drawings shows in the form of a flowchart the steps taken in the hereinbefore described circuit arrangement of FIG. 4.

When the air conditioning system is actuated to start, the desired internal temperature Td, the detected ambient temperature Ta, the detected internal temperature Ti, the detected angular position P of the air-flow proportioning door 15 (FIG. 1) and the detected evaporator temperature Te are registered in a first step 50. In the first step 50 are further registered the piece of information indicative of the position of the intake-air shift door 5 in the system shown in FIG. 1, the piece of information C indicated whether the refrigerant compressor unit 10 in the system shown in FIG. 1 is in operation or at rest and the piece of information A indicating the person's command to put the compressor unit 10 into or out of operation. As previously described, these pieces of informations S, C and A are produced by the intake-air shift switch 38, the compressor actuating switch 39, and the air conditioner switch 39', respectively, in the circuit arrangement illustrated in FIG. 4. Out of the various pieces of information Td, Ta, Ti, P, Te, S, C and A thus registered in the first step 50, the pieces of information representative of the desired internal temperature Td, the detected ambient temperature Ta and the detected internal temperature Ti are processed in a second step 51 to calculate the target blowoff temperature Tt at the function f(Td, Ta, Ti) of the temperatures Td, Ta and Ti in accordance with the previously shown Equations 3, 4 and 5. The second step 51 is followed by a third step 52 to determine from the piece of information A registered in the first step 50 whether or not the person in the space to be air conditioned commands to put the compressor unit 10 into operation. If the answer in the third step 52 is in the affirmative YES, the third step 52 proceeds to a fourth step 53 in which the target blowoff temperature Tt calculated in the second step 51 is compared with a predetermined critical value Ttt so as to determine whether or not the former is lower than the latter. If, in this instance, the target blowoff temperature Tt is lower than the predetermined critical value Ttt, a signal Dp' is produced in a fifth step 54, indicating the zero-degree angular position Po of the air-flow proportioning door 15 (FIG. 1). If the target blowoff temperature Tt is higher than the predetermined critical value Ttt, then a signal Dp' is produced in a sixth step 55, indicating a desired angular position P' of the air-flow proportioning door 15 as the function $g_1(Tt)$ of the target blowoff temperature Tt in accordance with the characteristic indicated by the plot $G_1$ in FIG. 5A. If, on the other hand, the answer in the third step 52 is in the negative NO, namely, the air conditioner switch 39' is open, the third step 52 proceeds to a seventh step 56 so as to produce a signal Dp' indicative of a desired angular position P' of the air-flow proportioning door 15 (FIG. 1) as the function $g_2(Tt)$ or the function $g_3(Tt)$ of the target blowoff temperature Tt in accordance with the characteristic indicated by the plot $G_2$ or the plot $G_3$, respectively, in FIG. 5B depending upon the piece of information S registered in the first step 50.

When the person in the space to be air conditioned commands to put the compressor unit 10 into operation, the above mentioned fifth and sixth steps 54 and 55 are followed by eighth and ninth steps 57 and 58, respectivelys. In the eighth step 57, signals $De_1$ and $De_2$ are produced which are indicative of desired compressor stop and start temperatures $T_1$ and $T_2$ as the functions $h_1(Tt)$ and $h_2(Tt)$, respectively, of the target blowoff temperature Tt lower than the predetermined critical value Ttt in accordance with the temperature characteristics indicated by the plots $H_1$ and $H_2$ in FIG. 6. On the other hand, in the ninth step 58 are produced signals $De_1$ and $De_2$ which are indicative of desired compressor stop and start temperatures $T_1$ and $T_2$ as the constants $h_1(Ttt)$ and $h_2(Ttt)$, respectively, in accordance with the temperature characteristics also indicated by the plots $H_1$ and $H_2$ in FIG. 6. The eighth or ninth step 57 or 58 is followed by a tenth step 59 to determine from the piece of information C registered in the first step 50 whether or not the refrigerant compressor unit 10 (FIG. 1) is in operation. If the answer in the tenth step is in the affirmative YES, the tenth step 50 proceeds to an eleventh step 60 in which the detected evaporator temperature Te is compared with the desired compressor stop temperature T1 thus determined in the eighth step 57 or ninth step 58. If, in this instance, the detected evaporator temperature Te is found higher than the desired compressor stop temperature T1, a command signal Cc is produced in a twelfth step 61, causing the refrigerant compressor unit 10 in the system illustrated in FIG. 1 to remain operative. If, however, the detected evaporator temperature Te is found lower than the desired compressor stop temperature T1, the solenoid coil of the solenoid-operated clutch of the refrigerant compressor unit 10 is de-energized and as a consequence the compressor unit 10 is brought to a stop. If, on the other hand, the answer in the tenth step 59 is in the negative NO, the tenth step 59 proceeds to a thirteenth step 62 in which the detected evaporator temperature Te is compared with the desired compressor start temperature T2. If, in this instance, the detected evaporator temperature Te is found higher than the desired compressor start temperature T2, the command signal Cc is produced in the twelfth step 61, causing the refrigerant compressor 10 in the system illustrated in FIG. 1 to be actuated to start. If, however, the detected evaporator temperature Te is found lower than the desired compressor stop temperature T2, the solenoid coil of the solenoid-operated clutch of the refrigerant compressor unit 10 is de-energized and as a consequence the compressor unit 10 is to remain inoperative.

In the meantime, the desired angular position P' of the air-flow proportioning door 15 as determined in one of the fifth, sixth and seventh steps 54, 55 and 56 is compared in a fourteenth step 63 with the detected angular position P registered in the first step 50. In the fourteenth step 63 is thus produced a command signal Cb on the basis of the difference between the detected and desired angular positions P and P' of the door 15. The solenoid-operated air-induction and vacuum induction valves 28 and 29 in the system illustrated in FIG. 1 are thus operated to drive the air-flow proportioning door 15 to turn through an angle dictated by the command signal Cb until door 15 assumes the desired angular position P'.

As will have been understood from the foregoing description, the control device according to the present invention is characterized in that the device has two different modes of operation depending upon the target blowoff temperature Tt calculated from the desired internal temperature Td, detected ambient temperature Ta and detected internal temperature Ti of the vehicle. When the target blowoff temperature Tt is lower than the predetermined critical value Ttt, the air-flow proportioning door 15 is maintained in the zero-degree position thereof with respect to the heater unit 14 and, furthermore the refrigerant compressor unit 10 is brought to a stop and thereafter actuated to start at the desired compressor stop and start temperatures $T_1$ and $T_2$ which vary with the target blowoff temperature Tt. When, on the other hand, the target blowoff temperature Tt is higher than the predetermined critical value Ttt, the angular position of the air-flow proportioning door 15 is controlled to vary with the target blowoff temperature Tt and, furthermore, the refrigerant compressor unit 10 is operated to automatically stop and start at fixed temperatures independently of the target blowoff temperature Tt. By reason of these two different modes of operation, the duty factor of the air conditioner compressor unit 10 is significantly reduced at relatively low target blowoff temperatures and more remarkably at relatively high target blowoff temperatures. The control device according to the present invention is thus adapted for the saving of the energy to be consumed by an air conditioning system for automotive use.

What is claimed is:

1. A method of controlling an air conditioning system including a refrigerant evaporator unit, a refrigerant compressor unit, a heater unit positioned downstream of the evaporator unit and an air-flow proportioning door positioned between the evaporator unit and the heater unit and with respect to the heater unit movable into and out of a predetermined angular position shutting off the flow of air from the evaporator unit to the heater unit, comprising the steps of (1) producing signals and pieces of information, said signals being respectively representative of a desired temperature of the space to be air conditioned, a detected atmospheric temperature, a detected temperature of the air conditoned space, a detected angular position of said air-flow proportioning door, and a detected evaporator temperature of the air passed through said evaporator unit, said pieces of information being respectively indicative of the operative or inoperative condition of said refrigerant compressor, and a command of a person in the air conditioned space to put the refrigerant compressor unit into or out of operation, (2) producing from the signals representative of the desired temperature of the space to be air conditioned, the detected atmospheric temperature and the detected temperature of the air conditioned space a target blowoff temperature of the air to be delivered from said evaporator unit, (3) comparing said target blowoff temperature with a predetermined critical temperature for producing a signal indicative of said predetermined angular position of the air-flow proportioning door when the target blowoff temperature is found lower than said predetermined critical value or indicative of a desired angular position of the door, said desired angular position of the door being variable with said target blowoff temperature, (4) in the presence of said piece of information indicating the person's command to put said refrigerant compressor into operation, producing from said target blowoff temperature signals respectively representative of desired compressor stop and start temperatures at which the compressor unit is to be brought to a stop and thereafter actuated to start, the desired compressor stop and start temperatures being variable with said target blowoff temperature when the target blowoff temperature is lower than said predetermined critical value and being fixed when the target blowoff temperature is higher than said predetermined critical value, (5) comparing the signal representative of said detected evaporator temperature with said signals respectively representative of the desired compressor stop and start temperatures for producing a command signal to hold said compressor unit operative when the detected evaporator temperature is found higher than the desired compressor stop temperature with the piece of information indicating the operating condition of the refrigerant compressor unit and to actuate the compressor unit to a start when the detected evaporator temperature is found higher than the desired compressor start temperature with the piece of information indicating the inoperating condition of the refrigerant compressor unit, the command signal bringing the refrigerant compressor unit to a stop when the detected evaporator temperature is found lower than the desired compressor stop temperature with the piece of information indicating the operating condition of the refrigerant compressor unit, the command signal further holding the refrigerant compressor unit inoperative when the detected evaporator temperature is lower than the desired compressor start temperature with the piece of information indicating the inoperating condition of the refrigerant compressor unit, and (6) in the presence of the signal representative of said desired angular position, comparing the signal representative of the desired angular position with the signal representative of the detected angular position of the air-flow proportioning door for producing a command signal indicative of the angular position to which said air-flow proportioning door is to be moved.

2. A method as set forth in claim 1, further comprising the step of producing the signal representative of said desired angular position as a first desired angular position of said air-flow proportioning door when said piece of information indicates the person's command to put said refrigerant compressor unit into operation and said target blowoff temperature is found higher than said predetermined critical value or, when the piece of information indicates the person's command to put the refrigerant compressor unit out of operation, a signal representative of a second desired angular position of the air-flow proportioning door and variable with said target blowoff temperature, one of the signals representative of the first and second desired angular positions being compared with the signal representative of said detected angular position of the air-flow proportioning door for producing said command signal indicative of the angular position to which the air-flow proportioning door is to be moved in the presence of the signal representative of the first or second desired angular position.

3. A method as set forth in claim 2, in which said air conditioning system further includes a fresh air intake, a recirculated air intake and a shift door operative to selectively close one of the fresh and recirculated air intakes, the method further comprising the steps of detecting the position of said shift door for producing a signal representative of a third desired angular position of the air-flow proportioning door when said piece of information indicates the person's command to put said refrigerant compressor unit out of operation and concurrently the position of said shift door is detected as fully closing one of said air intakes, the signal representative of said second desired angular position being produced when the piece of information indicates the person's command to put the refrigerant compressor unit out of operation and concurrently said shift door is detected to be in the position closing the other of said fresh and recirculated air intakes, said third desired angular position being variable with said target blowoff temperature, one of the signals representative of the first, second and third desired angular positions being compared with the signal representative of said detected angular position of the air-flow proportioning door for producing said command signal indicative of the angular position to which the air-flow proportioning door is to be moved in the presence of the signal representative of the first, second or third desired angular position.

4. A method as set forth in any one of claims 1 to 3, in which said desired compressor start temperature is constantly higher by a predetermined value than said desired compressor stop temperature.

5. A control device of an air conditioning system including a refrigerant evaporator unit, a refrigerant compressor unit including electrically-operated actuating means, a heater unit positioned downstream of the evaporator unit, an air-flow proportioning door positioned between the evaporator unit and the heater unit and movable with respect to the heater unit into and out of a predetermined angular position shutting off the flow of air from the evaporator unit to the heater unit, and electrically-operated door actuating means operative to drive said air-flow proportioning door to continuously move out of and into said predetermined angular position thereof, comprising:

means operative to produce signals respectively representative of a desired temperature of the space to be air conditioned, a detected atmospheric temperature, a detected temperature of the air conditioned space, a detected angular position of said air-flow proportioning door, and a detected evaporator temperature of the air passed through said evaporator unit, switch means operative to produce pieces of information respectively indicative of the operative or inoperative condition of said refrigerant compressor unit, and a command of a person in the air conditioned space to put the refrigerant compressor unit into or out of operation, a target blowoff temperature calculating module responsive to the signals representative of the desired temperature of the space to be air conditioned, the detected atmospheric temperature and the detected temperature of the air conditioned space, the target blowoff temperature calculating module being operative to produce a signal representative of a target blowoff temperature of the air to be delivered from said evaporator unit, the target blowoff temperature being variable with the desired temperature of the space to be air conditioned, the detected atmospheric temperature and the detected temperature of the air conditioned space, a desired door-position calculating module responsive to the signal from the target blowoff temperature calculating module and operative to compare the target blowoff temperature with a predetermined critical value for producing a signal indicative of said predetermined angular position of said air-flow proportioning door when the target blowoff temperature is found lower than said predetermined critical value or indicative of a desired angular position of the door, the signal representative of the desired angular position of the door being variable with the signal representative of said target blowoff temperature, a desired evaporator temperature calculating module responsive to the signal from said target temperature calculating module and operative to produce signals respectively representative of desired compressor stop and start temperatures at which said compressor unit is to be brought to a stop and thereafter actuated to start in the presence of said piece of information indicating the person's command to put the refrigerant compressor into operation, the signals produced by the desired evaporator temperature calculating module being variable with the signal from said target temperature calculating module when the target blowoff temperature is lower than said predetermined critical value and being fixed when the target blowoff temperature is higher than the predetermined critical value, a door-position error detecting module responsive to the signal from said desired door-position calculating module and the signal representative of the detected angular position of said air-flow proportioning door and operative to compare these signals with each other for supplying to said door actuating means a command signal indicative of the angular position to which said air-flow proportioning door is to be moved, and a temperature comparator module responsive to the signals from said desired evaporator temperature calculating module and the signal representative of the detected evaporator temperature and operative to compare the signal representative of the detected evaporator temperature with the signals representative of said desired compressor stop and start temperatures for supplying to said actuating means of the compressor unit a command signal effective to hold the compressor unit operative when the detected evaporator temperature is found higher than the desired compressor stop temperature with the piece of information indicating the operating condition of the refrigerant compressor unit and to actuate the compressor unit to a start when the detected evaporator temperature is found higher than the desired compressor start temperature with the piece of information indicating the inoperating condition of the refrigerant compressor, said command signal bringing the refrigerant compressor unit to a stop when the detected evaporator temperature is found lower than the desired compressor stop temperature with the piece of information indicating the operating condition of the refrigerant compressor unit, said command signal further holding the refrigerant compressor unit inoperative when the detected evaporator temperature is found lower than the desired compressor start temperature with the piece of information indicating the inoperating condition of the refrigerant compressor.

6. A control device as set forth in claim 5 wherein said desired door-position calculating module is operative to produce said signal representative of said desired angular position as a first desired angular position of said air-flow proportioning door when said piece of information indicates the person's command to put said refrigerant compressor unit into operation and said target blowoff temperature is found higher than said predetermined critical value by the desired door-position calculating module or, when the piece of information indicates the person's command to put the refrigerant compressor unit out of operation, a signal representative of a second desired angular position of the air-flow proportioning door and variable with said target blowoff temperature, said door-position error detecting module being operative to compare one of the signals representative of the first and second desired angular positions with the signal representative of the detected angular position of the air-flow proportioning door and to supply to said door actuating means said command signal indicative of the angular position to which the air-flow proportioning door is to be moved in the presence of the signal representative of the first or second angular position.

7. A control device as set forth in claim 6, in which said air conditioning system further includes a fresh air intake, a recirculated air intake and a shift door operative to selectively close one of the fresh and recirculated air intakes and in which said switch means constitutes first switch means, the control device further comprising second switch means responsive to each of the positions of said shift door closing said fresh and recirculated air intakes, said desired door-position calculating module being operative to produce the signal representative of said second desired angular position when said piece of information produced by the first switch means indicates the person's command to put said refrigerant compressor unit out of operation and concurrently said shift door is detected by said second switch means as being in one of said positions thereof or a signal representative of a third desired angular position of said air-flow proportioning door when the piece of information produced by the first switch means indicates the person's command to put the refrigerant compressor unit out of operation and concurrently the shift door is detected by said second switch means as being in the other of said positions thereof, the signal representative of the third desired angular position being variable with the signal representative of said target blowoff temperature, said door-position error detecting module being operative to compare one of the signals representative of the first, second and third desired angular positions with the signal representative of the detected angular position of said air-flow proportioning door and to supply to said door actuating means said command signal indicative of the angular position to which the air-flow proportioning door is to be moved in the presence of the signal representative of the first, second or third desired angular position.

* * * * *